(12) United States Patent
Hofmann et al.

(10) Patent No.: US 7,617,343 B2
(45) Date of Patent: Nov. 10, 2009

(54) SCALABLE BUS STRUCTURE

(75) Inventors: Richard Gerard Hofmann, Cary, NC (US); Mark Michael Schaffer, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 660 days.

(21) Appl. No.: 11/070,016

(22) Filed: Mar. 2, 2005

(65) Prior Publication Data

US 2006/0198388 A1 Sep. 7, 2006

(51) Int. Cl.
*G06F 13/42* (2006.01)
*G06F 13/00* (2006.01)
*G06F 13/36* (2006.01)
*H04Q 1/30* (2006.01)
*H04L 1/18* (2006.01)

(52) U.S. Cl. .................. 710/106; 710/110; 710/305; 710/310; 340/7.22; 714/749

(58) Field of Classification Search .................. 710/305, 710/11, 310
See application file for complete search history.

(56) References Cited

U.S. PATENT DOCUMENTS

| | | | |
|---|---|---|---|
| 5,255,376 A | | 10/1993 | Frank |
| 5,911,056 A | * | 6/1999 | Faget et al. ................. 710/305 |
| 5,925,118 A | * | 7/1999 | Revilla et al. ............... 710/110 |
| 5,926,831 A | * | 7/1999 | Revilla et al. ............... 711/137 |
| 6,038,646 A | | 3/2000 | Sproull |
| 6,073,210 A | | 6/2000 | Palanca |
| 6,081,860 A | * | 6/2000 | Bridges et al. .............. 710/110 |
| 6,430,641 B1 | * | 8/2002 | Hofmann et al. ............ 710/240 |
| 6,654,836 B1 | * | 11/2003 | Misra et al. ................. 710/110 |
| 6,772,254 B2 | * | 8/2004 | Hofmann et al. ............ 710/110 |

(Continued)

FOREIGN PATENT DOCUMENTS

GB 2362735 A 11/2001

(Continued)

OTHER PUBLICATIONS

HyperTransport Technology Consortium, "HyperTransport I/O Link Specification Revision 1.10", Aug. 25, 2003, 330 pages.*

(Continued)

*Primary Examiner*—Mark Rinehart
*Assistant Examiner*—Brian T Misiura
(74) *Attorney, Agent, or Firm*—Nicholas J. Pauley; Peter M. Kamarchik; Sam Talpalatsky (57) ABSTRACT

A processing system is disclosed with a sending component and a receiving component connected by a bus. The bus may be configured with transmit and receive channels. The transmit channel may have a plurality of sub-channels. The sending component may be configured to broadcast on each of the sub-channels information comprising read and write address locations, read and write control signals, and write data on each of the sub-channels. The receiving component may be configured to store the write data and retrieve read data in response to the information broadcast on any of the sub-channels, and broadcast the retrieved read data on the receive channel to the sending component. The sending component may further be configured to provide to the receiving component independent signaling for each of the sub-channels, the independent signaling being sufficient to allow the receiving component to determine the type of information broadcast on each of the sub-channels.

20 Claims, 8 Drawing Sheets

U.S. PATENT DOCUMENTS

| | | | |
|---|---|---|---|
| 6,883,108 B2 * | 4/2005 | Lee et al. | 714/4 |
| 6,957,313 B2 * | 10/2005 | Hsia et al. | 711/170 |
| 7,103,823 B2 * | 9/2006 | Nemawarkar et al. | 714/758 |
| 7,146,510 B1 * | 12/2006 | Helms et al. | 713/300 |
| 7,209,998 B2 * | 4/2007 | Hofmann et al. | 710/305 |
| 7,404,044 B2 * | 7/2008 | Moll | 711/141 |
| 2003/0126331 A1 | 7/2003 | Levy | |
| 2004/0123123 A1 * | 6/2004 | Buer et al. | 713/189 |
| 2005/0182884 A1 * | 8/2005 | Hofmann et al. | 710/305 |
| 2005/0198416 A1 * | 9/2005 | Kim | 710/100 |
| 2007/0088894 A1 * | 4/2007 | Hofmann et al. | 710/305 |

OTHER PUBLICATIONS

International Search Report-PCT/US06/007810, International Search Authority-European Patent Office-Jun. 22, 2006.

Written Opinion-PCT/US06/007810, International Search Authority-European Patent Office-Jun. 22, 2006.

International Preliminary Report on Patentability-PCT/US06/007810, The International Bureau of WIPO, Geneva Switzerland-Sep. 11, 2007.

* cited by examiner

SCALABLE BUS STRUCTURE

BACKGROUND

1. Field

The present disclosure relates generally to digital systems, and more specifically, to a scalable bus structure.

2. Background

Computers have revolutionized the electronics industry by enabling sophisticated processing tasks to be performed with just a few strokes of a keypad. These sophisticated tasks involve an incredibly high number of complex components that communicate with one another in a fast and efficient manner using a bus. A bus is a channel or path between components in a computer.

Many buses resident in a computer have traditionally been implemented as shared buses. A shared bus provides a means for any number of components to communicate over a common path or channel. In recent years, shared bus technology has been replaced to a large extent by point-to-point switching connections. Point-to-point switching connections provide a direct connection between two components on the bus while they are communicating with each other. Multiple direct links may be used to allow several components to communicate at the same time.

A typical computer includes a microprocessor with system memory. A high bandwidth system bus may be used to support communications between the two. In addition, there may also be a lower performance peripheral bus which is used to transfer data to lower bandwidth peripherals. In some cases, there may also be a configuration bus which is used for the purpose of programming various resources. Bridges may be used to efficiently transfer data between the higher and lower bandwidth buses, as well as provide the necessary protocol translation. Each of these buses have been implemented in the past with different protocols because of the wide variation in performance requirements between them.

The use of multiple bus structures in a computer has provided a workable solution for many years. However, as area and power emerge as the major design considerations for integrated circuits, it is becoming increasingly desirable to reduce the complexity of the bus structure.

SUMMARY

In one aspect of the present invention, a processing system includes a bus having transmit and receive channels, the transmit channel having a plurality of sub-channels, a sending component configured to broadcast on each of the sub-channels information comprising read and write address locations, read and write control signals, and write data, and a receiving component configured to store the write data and retrieve read data in response to the information broadcast on any of the sub-channels, and broadcast the retrieved read data on the receive channel to the sending component. The sending component is further configured to provide to the receiving component independent signaling for each of the sub-channels, the independent signaling being sufficient to allow the receiving component to determine the type of information broadcast on each of the sub-channels.

In another aspect of the present invention, a method of communications between a sending component and a receiving component over a bus may be performed. The bus includes transmit and receive channels, and the transmit channel has a plurality of sub-channels. The method includes broadcasting from the sending component to the receiving component on each of the sub-channels information comprising read and write address locations, read and write control signals, and write data, providing from the sending component to the receiving component independent signaling for each of the sub-channels, the independent signaling being sufficient to allow the receiving component to determine the type of information broadcast on each of the sub-channels, storing the write data and retrieving read data in response to the information broadcast on any of the sub-channels, and broadcasting the retrieved read data on the receive channel to the sending component.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Various components in a processing system may communicate over a bus. The bus may be scalable in terms of width and clock frequency to support the bandwidth requirements of the various components. The bus may also use a common architecture and signaling protocol for all scalable configurations. This may be achieved by reducing the signaling protocol of the bus to only those signals necessary to either transmit or receive information.

The bus architecture may include a "transmit channel" that provides a generic medium for broadcasting information from a sending component to a receiving component in a time division multiplexed fashion. A "receive channel" may be used to broadcast information from the receiving component to the sending component using the same signal protocol as the transmit channel.

Figure 1:
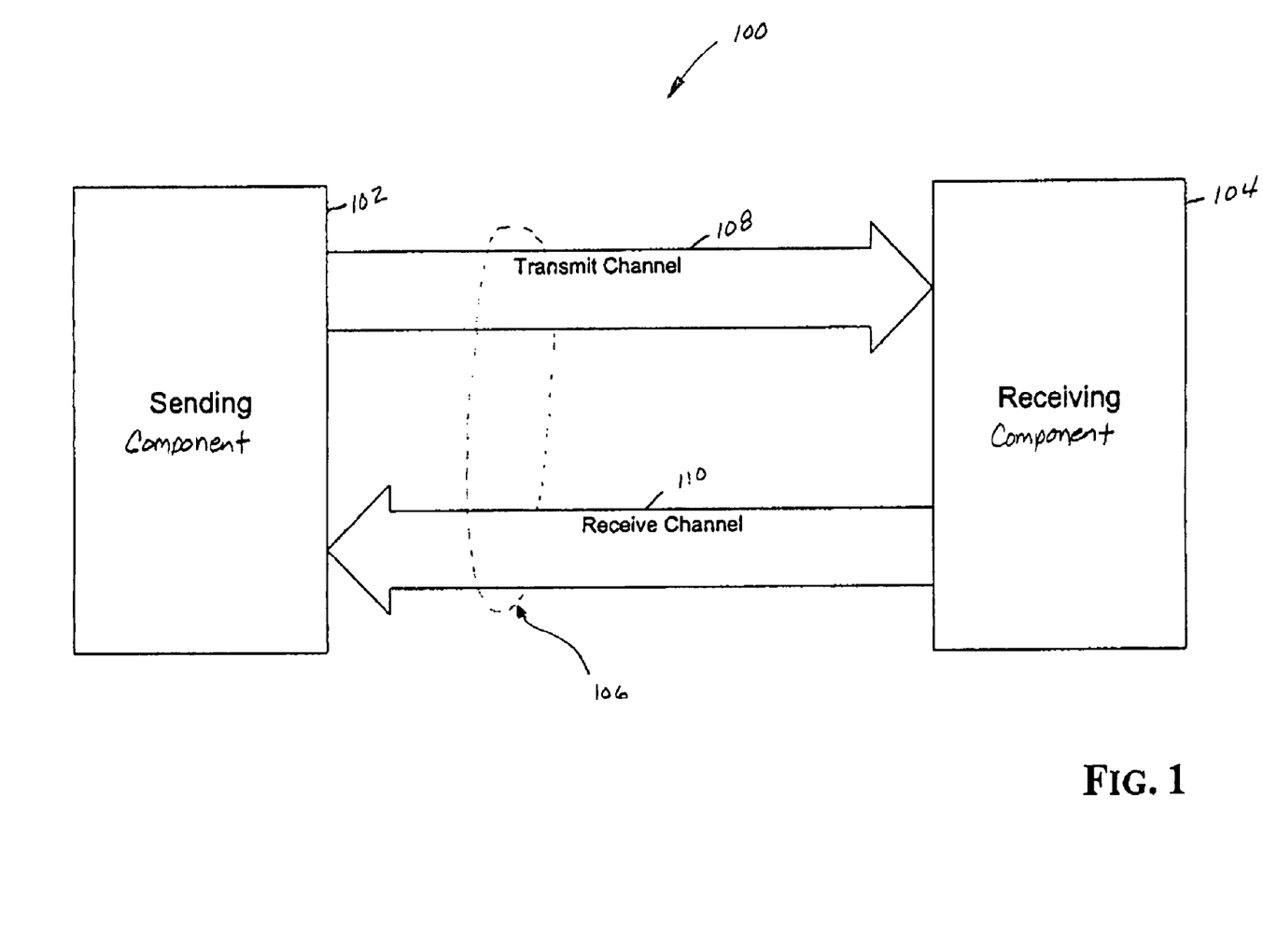
FIG. 1 is a conceptual block diagram illustrating an example of a point-to-point connection over a two channel bus between two components in a processing system.

FIG. 1 is a conceptual block diagram illustrating this bus architecture. A point-to-point connection over a bus between two components is shown in a processing system. The processing system 100 may be a collection of components that cooperate to perform one or more processing functions. Typically, the processing system will be a computer, or resident in a computer, and capable of processing, retrieving and storing information. The processing system may be a stand-alone system. Alternatively, the processing system may be embedded in any device, including by way of example, a cellular telephone.

In one embodiment of the processing system 100, the bus 106 is a dedicated bus between the sending component 102 and the receiving component 104. In another embodiment of the processing system 100, the sending component 102 communicates with the receiving component 104 with a point-to-point connection over the bus 106 through a bus interconnect (not shown). Moreover, as those skilled in the art will readily appreciate, the inventive aspects described throughout this disclosure are not limited to a dedicated bus or point-to-point switching connection, but may be applied to any type of bus technology including, by way of example, a shared bus.

The sending component 102 may be any type of bus mastering component including, by way of example, a microprocessor, a digital signal processor (DSP), a direct memory access controller, a bridge, a programmable logic component, discrete gate or transistor logic, or any other information processing component.

The receiving component 104 may be any storage component, including, by way of example, registers, memory, a bridge, or any other component capable of retrieving and storing information. The storage capacity at each address location of the receiving component may vary depending on the particular application and the overall design constraints. For the purposes of explanation, the receiving component will be described with a storage capacity of 1-byte per address location.

The sending component 102 may read from or write to the receiving component 104. In the case where the sending component 102 writes to the receiving component 104, the sending component may broadcast an address location, the appropriate control signals, and the payload to the receiving component 104 on the transmit channel 108. The "payload" refers to the data associated with a particular read or write operation, and in this case, a write operation.

The control signals may include transfer qualifiers. The term "transfer qualifier" refers to a parameter that describes an attribute of a read operation, a write operation, or another bus related operation. In this case, the transfer qualifiers may include a "payload size signal" to indicate the number of data bytes contained in the payload. If the payload is multiple bytes, then the receiving component 104 may store the payload in a block of sequential address locations beginning with the address location broadcast on the transmit channel 108. By way of example, if the sending device 102 broadcasts an address location $100_{HEX}$ followed by a 4-byte payload, the receiving component 104 may write the payload to a block of sequential address locations starting at $100_{HEX}$ and ending at $103_{HEX}$.

The control signals may also include write byte enables. "Write byte enables" may be used to indicate which byte lanes on the transmit channel 108 will be used to broadcast the payload for a write operation. By way of example, a 2-byte payload broadcast on a 32-bit transmit channel 108 may use 2 of the 4 byte lanes. The write byte enables may be used to indicate to the receiving component 104 which of the 2 byte lanes on the transmit channel 108 will be used to broadcast the payload.

In the case where the sending component 102 reads from the receiving component 104, the address location and the appropriate transfer qualifiers may be the only information that needs to be broadcast on the transmit channel 108. The transfer qualifiers may include a payload size signal to indicate the number of data bytes contained in the payload. The receiving component 104 may acknowledge the broadcast and send the payload on the receiving channel 110. If the payload is multiple bytes, then the receiving component 104 may read the payload from a block of sequential address locations beginning with the address location broadcast on the transmit channel 108. By way of example, if the sending device 102 broadcasts an address location $200_{HEX}$ and requests a 4-byte payload, the receiving component 104 may retrieve the payload from a block of sequential address locations starting at $200_{HEX}$ and ending at $203_{HEX}$.

In the embodiment of the processing system described thus far, the sending component 102 has total control of the transmit channel 108. Also, the transmit and receive channels 108 and 110 are totally independent, and thus, the broadcasting of address locations, control signals, and write data by the sending component may coincide with the broadcasting of read data by the receiving component 104. "Write data" refers to data broadcast by the sending component 102, and "read data" refers to data read from the receiving component 104 and broadcast on the receiving channel 110.

In one embodiment of the processing system, the payload for a write operation is broadcast on the transmit channel 108 following the broadcast of its corresponding address location. In this embodiment, one or more read operation requests may be interleaved between the broadcast of the address location and payload for the write operation, but the payload is broadcast before a new write operation is initiated. Under these conditions, the receiving component 104 can easily identify the payload for any particular write operation.

In other embodiments of the processing system, multiple write operations may be initiated by the sending component 102 by broadcasting a series of address locations with the appropriate control signals on the transmit channel 108 before broadcasting a single payload. In this case, a protocol should be used that allows the receiving component 104 to correlate each payload broadcast on the transmit channel 108 to its corresponding address location. The protocol should also provide a means for the sending component 102 to correlate each payload broadcast on the receive channel 110 to its corresponding address location broadcast on the transmit channel 108. One way to correlate address locations to payloads is through an implicit addressing scheme. An implicit addressing scheme may provide for payload broadcasts on the transmit channel 108 in the same order that the address locations are broadcast for write operations. The implicit addressing scheme may also provide for payload broadcasts on the receive channel 110 in the same order that the address locations are broadcast on the transmit channel 108 for read operations.

"Transfer tags" may be used as an alternative to an implicit addressing scheme. The sending component 102 may assign a transfer tag for each read and write operation. The transfer tag may be included in the transfer qualifiers broadcast on the transmit channel 108. In the case of a write operation, the sending component 102 may send the transfer tag with the payload, and the receiving component 104 may use the transfer tag recovered from the transfer qualifiers to identify the payload. In the case of a read operation, the receiving component 104 may send the recovered transfer tag with the payload, and the sending component may use the transfer tag to identify the payload.

The various concepts described thus far may be implemented using any number of protocols. In the detailed description to follow, an example of a bus protocol will be presented. This bus protocol is being presented to illustrate the inventive aspects of a processing system, with the understanding that such inventive aspects may be used with any suitable protocol. The basic signaling protocol for the transmit channel is shown below in Table 1. Those skilled in the art will readily be able to vary and/or add signals to this protocol in the actual implementation of the bus structure described herein.

TABLE 1

| Signal | Definition | Driven By |
|---|---|---|
| Clock | The reference clock signal | System |
| Valid | Valid information is being broadcast on the transmit channel | Sending Component |
| Type (2:0) | Indicates the type of information being broadcast | Sending Component |
| Transfer Ack | Indicates receiving component is ready to receive write data | Receiving Component |
| Transmit Channel | Channel driven by the sending component to broadcast information | Sending Component |

The same signaling protocol may be used for the receive channel as shown below in Table 2.

TABLE 2

| Signal | Definition | Driven By |
|---|---|---|
| Clock | The reference clock signal | System |
| Valid | Valid information is being broadcast on the receive channel | Receiving Component |
| Type (2:0) | Indicates the type of information being broadcast | Receiving Component |
| Transfer Ack | Indicates sending component is ready to receive read data | Sending Component |
| Receive Channel | Channel driven by the receiving component to broadcast information | Receiving Component |

The definition of the Type field used in this signaling protocol is shown in Table 3.

TABLE 3

| Type Value | Definition |
|---|---|
| 000 | Reserved |
| 001 | Valid Write Address Location |
| 010 | Valid Write Control Signals |
| 011 | Valid Write Data |
| 100 | Reserved |
| 101 | Valid Read Address Location |
| 110 | Valid Read Control Signals |
| 111 | Valid Read Data |

The definition of the Valid and Transfer Ack signals in this signaling protocol is shown in Table 4.

TABLE 4

| Valid; Transfer Ack | Definition |
|---|---|
| 0; 0 | Valid information is not being broadcast, and the component at the other end is not ready to receive a broadcast |
| 0; 1 | Valid information is not being broadcast, but the component at the other end is ready to receive a broadcast |
| 1; 0 | Valid information is being broadcast, but the component at the other end is not ready to receive a broadcast |
| 1; 1 | Valid information is being broadcast, and the component at the other end is ready to receive a broadcast |

Figure 2:
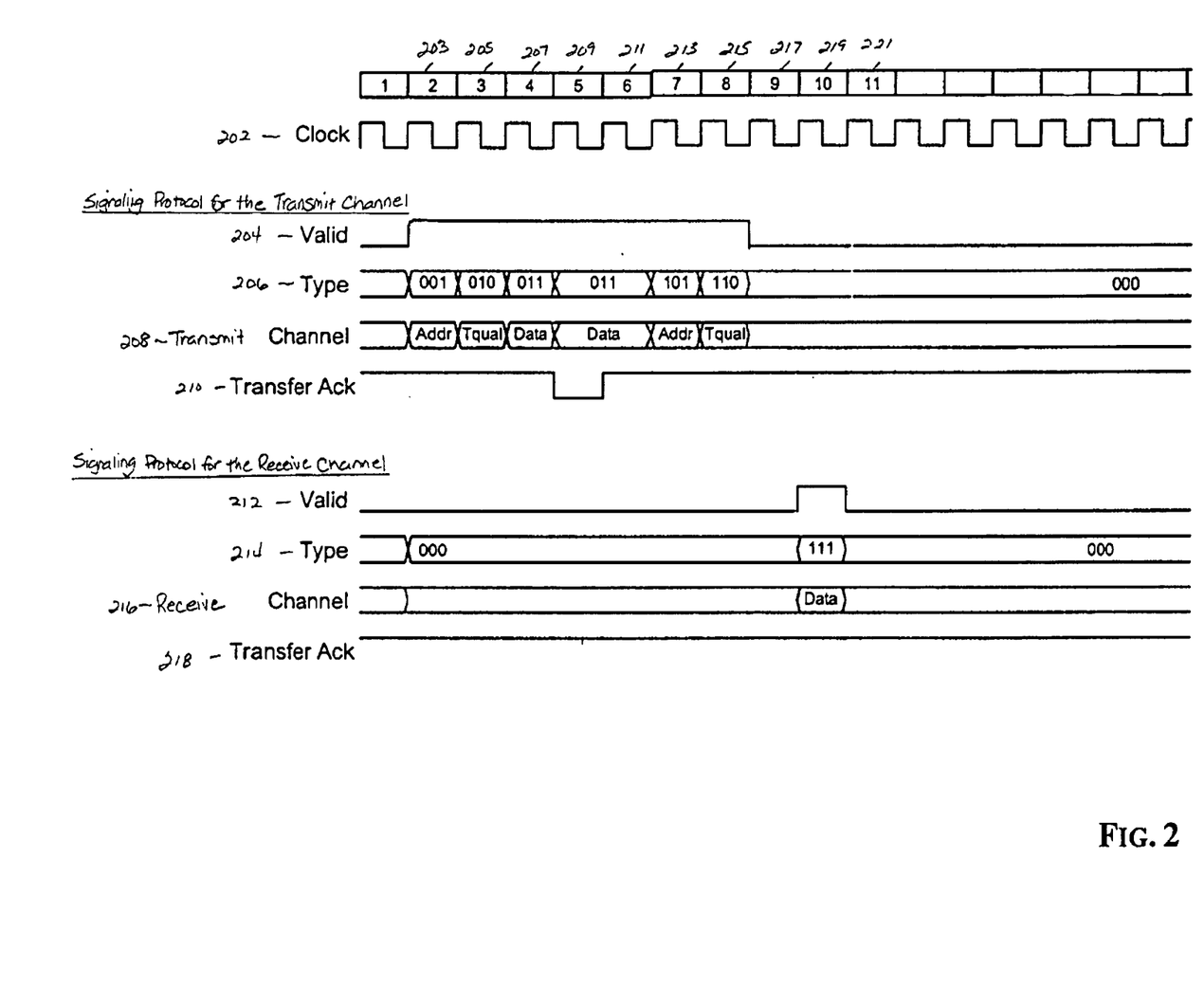
FIG. 2 is a timing diagram showing a read and write operation between two components in a processing system having a point-to-point connection over a two channel bus.

FIG. 2 is a timing diagram illustrating a read and write operation over a 32-bit transmit channel and a 32-bit receive channel. A System Clock 202 may be used to synchronize communications between the sending component and the receiving component. The System Clock 202 is shown with eleven clock cycles, with each cycle numbered sequentially for ease of explanation.

A write operation may be initiated by the sending component during the second clock cycle 203. This may be achieved by asserting the Valid signal 204 and setting the Type field 206 to signal a broadcast of an address location for a write operation. The address location may also be broadcast over the Transmit Channel 208 to the receiving component. In response to this broadcast, the receiving component stores the address location in its address queue. At the end of the second clock cycle 203, the sending component detects the assertion of the Transfer Ack signal 210, and determines that the broadcast of the address location has been received.

The broadcast of the address location may be followed by a control signal broadcast for the write operation in the third clock cycle 205. The sending component may alert the receiving component of the control signal broadcast by keeping the Valid signal 204 asserted and changing the Type field 206 appropriately. The control signal broadcast may include the transfer qualifiers and the write byte enables for the write operation. In this case, the transfer qualifiers may include a payload size signal indicating an 8-byte payload. The write byte enables may indicate that the 8-byte payload will be broadcast on all byte lanes of the Transmit Channel 208. The receiving component may determine from this information that the payload broadcast will be broadcast over two clock cycles. At the end of the third clock cycle 205, the sending component detects the assertion of the Transfer Ack signal 210, and determines that the control signal broadcast has been received.

The first 4-bytes of the payload for the write operation may be broadcast on the Transmit Channel 208 during the fourth clock cycle 207. The sending component may alert the receiving component of the payload broadcast by keeping the Valid signal 204 asserted and changing the Type field 206 to signal a payload broadcast. In the absence of transfer tags, the receiving component recognizes the write data as the first 4-bytes of the payload based on the implicit addressing scheme discussed earlier. In response to this broadcast, the first 4-bytes of the payload may be written to the receiving component. At the end of the fourth clock cycle 207, the sending component detects the assertion of the Transfer Ack signal 210, and determines that the broadcast of the first 4-bytes of the payload has been received.

In the following clock cycle 209, the Valid signal 204 and the Type field 206 remains unchanged as the second 4-bytes of the payload is broadcast on the Transmit Channel 208. However, the Transfer Ack signal 210 is no longer asserted by the receiving component indicating that it cannot accept the broadcast. The sending component may detect that the Transfer Ack signal 210 is not asserted at the end of this fifth clock cycle 209, and repeat the broadcast of the second 4-bytes of the payload in the following clock cycle 211. The sending component may continue to broadcast the second 4-bytes of the payload every clock cycle until the sending component detects the assertion of the Transfer Ack signal 210 from the receiving component. In this case, only one repeat broadcast is required and the second 4-bytes of the payload may be written to the receiving component in the sixth clock cycle. At the end of the sixth clock cycle 211, the sending component detects the assertion of the Transfer Ack signal 210, and determines that the broadcast of the second 4-bytes of the payload has been received.

A read operation may be initiated by the sending component during the seventh clock cycle 213. This may be achieved by asserting the Valid signal 204 and setting the Type field 206 to signal the broadcast of an address location for a read operation. The address location may then be broadcast over the Transmit Channel 208 to the receiving component. In response to this broadcast, the receiving component stores the address location in its address queue. At the end of the seventh clock cycle 213, the sending component detects the assertion of the Transfer Ack signal 210, and determines that the broadcast of the address location has been received.

The broadcast of the address location may be followed by a control signal broadcast for the read operation in the eighth clock cycle 215. The sending component may alert the receiving component of the control signal broadcast by keeping the Valid signal 204 asserted and changing the Type field 206 appropriately. The control signal broadcast may include the transfer qualifiers for the read operation. In this case, the transfer qualifiers may include a payload size signal indicating a 4-byte payload. The receiving component may determine from this information that the payload broadcast can be broadcast over one clock cycle. At the end of the eighth clock cycle 215, the sending component detects the assertion of the Transfer Ack signal 210, and determines that the control signal broadcast has been received.

Due to the read latency of the receiving component, a several clock cycle delay may be experienced before the read data is available. Once the 4-byte payload is available, the receiving component may assert the Valid signal 212 and assert the Type field 214 signaling a payload broadcast on the Receive Channel 216. Since the Transfer Ack signal 218 is asserted by the sending component, the broadcast of the payload may be completed in one clock cycle. The receiving component detects the assertion of the Transfer Ack signal 218 at the end of the tenth clock cycle 219, and determines that the payload broadcast has been received.

Figure 3:
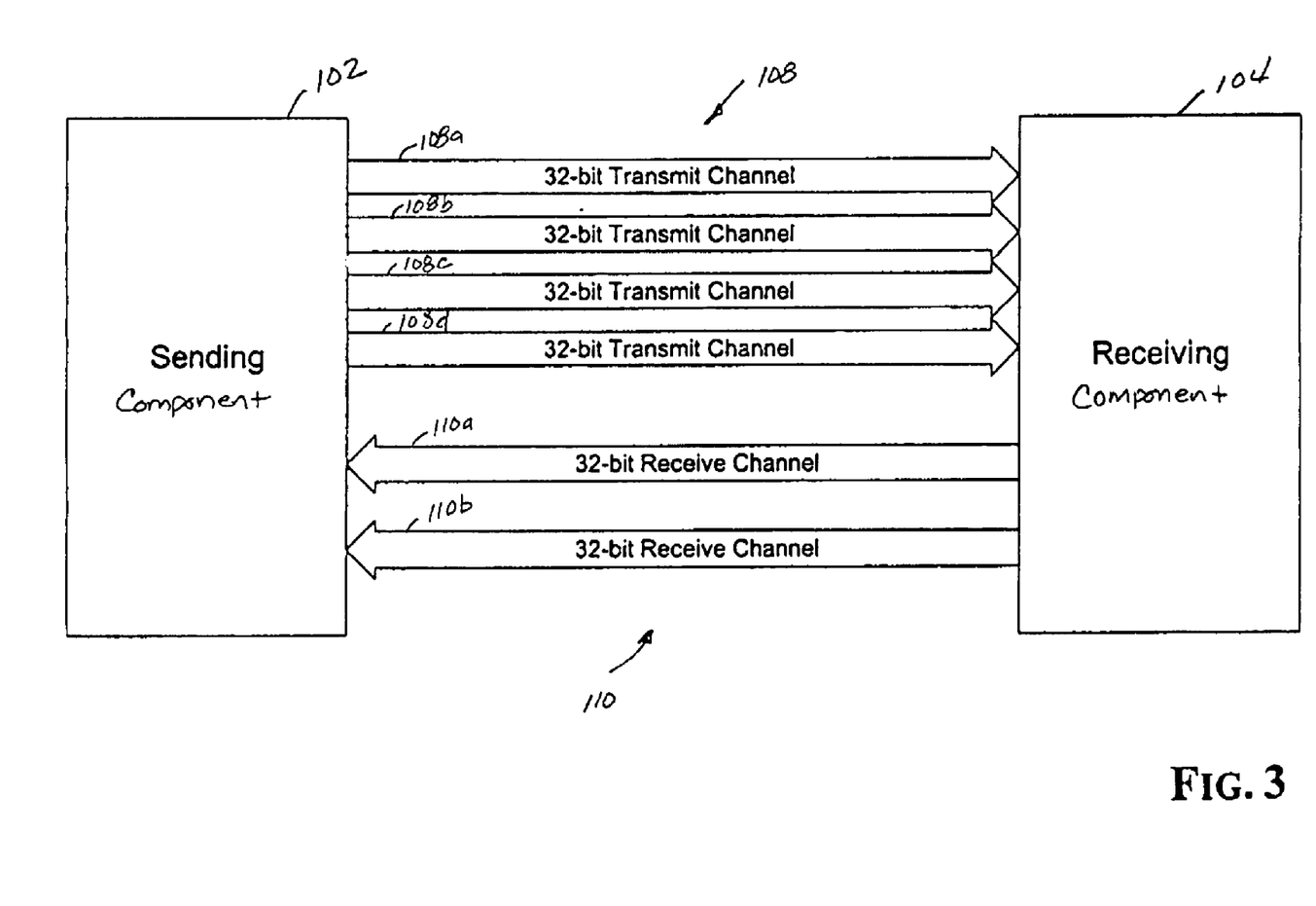
FIG. 3 is a conceptual block diagram illustrating an example of a point-to-point connection over a high performance two channel bus between two components in a processing system.

FIG. 3 is a conceptual block diagram illustrating a point-to-point connection between two components over a high performance bus. The transmit and receive channels 108 and 110 of the high performance bus may be implemented as multiple sub-channels with each sub-channel being 32-bits wide. In actual implementations, the number of sub-channels and the width of each sub-channel may vary depending on the performance requirements of the particular application. In this example, the transmit channel includes four 32-bit sub-channels 108a-108d, and the receive channel includes two 32-bit sub-channels 110a-110b. This implementation may be suitable, by way of example, for a system bus in a computer, or any other high performance bus. The term "sub-channel" refers to a group of wires or conductors which may be controlled independently of the other wires or conductors in the channel in terms of the type of information that is broadcast. By way of example, the sending component may broadcast, in a single clock cycle, a 32-bit address location on one sub-channel 108a, 32-bits of control signals including transfer qualifiers and write byte enables on another sub-channel 108b, and 8-bytes of write data on the remaining two sub-channels 108c and 108d.

In the various embodiments of the processing system described thus far, the receive channel is dedicated solely to payload broadcasts. Accordingly, there is no need for the receive channel to be broken up into sub-channels in these embodiments. A single 64-bit receive channel may be implemented, and thereby reduce the signaling requirements. However, in some embodiments of the processing system, the Type field in the signaling protocol may be extended to allow for the broadcast of other information on the receive channel 110. By way of example, a "write response" may be broadcast on the receive channel 110 to signal the sending component that the data has been written to the receiving component 104. The write response could be broadcast on the receive channel 110 using one of the reserved Type fields. In that case, it may be useful to have two independently controlled 32-bit sub-channels so that read data and a write response may be broadcast on the receive channel 110 simultaneously. With two 32-bit sub-channels, it may then be possible to simultaneously broadcast 4-bytes of read data, 2-bytes of read data and a 32-bit write response, or two 32-bit write responses. A single 64-bit receive channel 110, on the other hand, may be only able to support read data or write responses in any given clock cycle.

In a similar manner, the transmit channel may also be extended to include the broadcast of other types of information that are common in many bus protocols, such as standard commands. By way of example, a microprocessor attached to a bus may need to broadcast information to other components in the system such as a TLB Sync command, or a TLB invalidate command. These commands may be classified in the Type field without the need for additional signaling.

The sub-channel signaling may be implemented in a variety of ways depending on the preferences of the designer, the specific application, and the overall design constraints. In one embodiment of the processing system, each sub-channel may be provided with independent signaling capability. More specifically, each sub-channel has its own set of signals including valid and transfer acknowledge signals, as well as its own Type field. With this approach, the failure to detect an asserted Transfer Ack signal from the receiving component on one sub-channel does not impact the broadcasts on the other sub-channels. In this case, the sending component need only continue broadcasting on the sub-channel whose Transfer Ack signal was not asserted at the end of a clock cycle. In an alternative embodiment of the processing system, independent signaling may be limited to Type fields and the sub-channels may share a common Valid signal and Transfer Ack signal. In this embodiment, the receiving component would assert the Transfer Ack signal only if the broadcast was received on all sub-channels. As a result, the sending component would continue the broadcast on each sub-channel even if only one of the sub-channels did not acknowledge the broadcast at the end of a clock cycle. This approach reduces the signaling requirements and decreases the complexity of the processing system compared to a processing system with independently signaling across multiple sub-channels.

Figure 4:
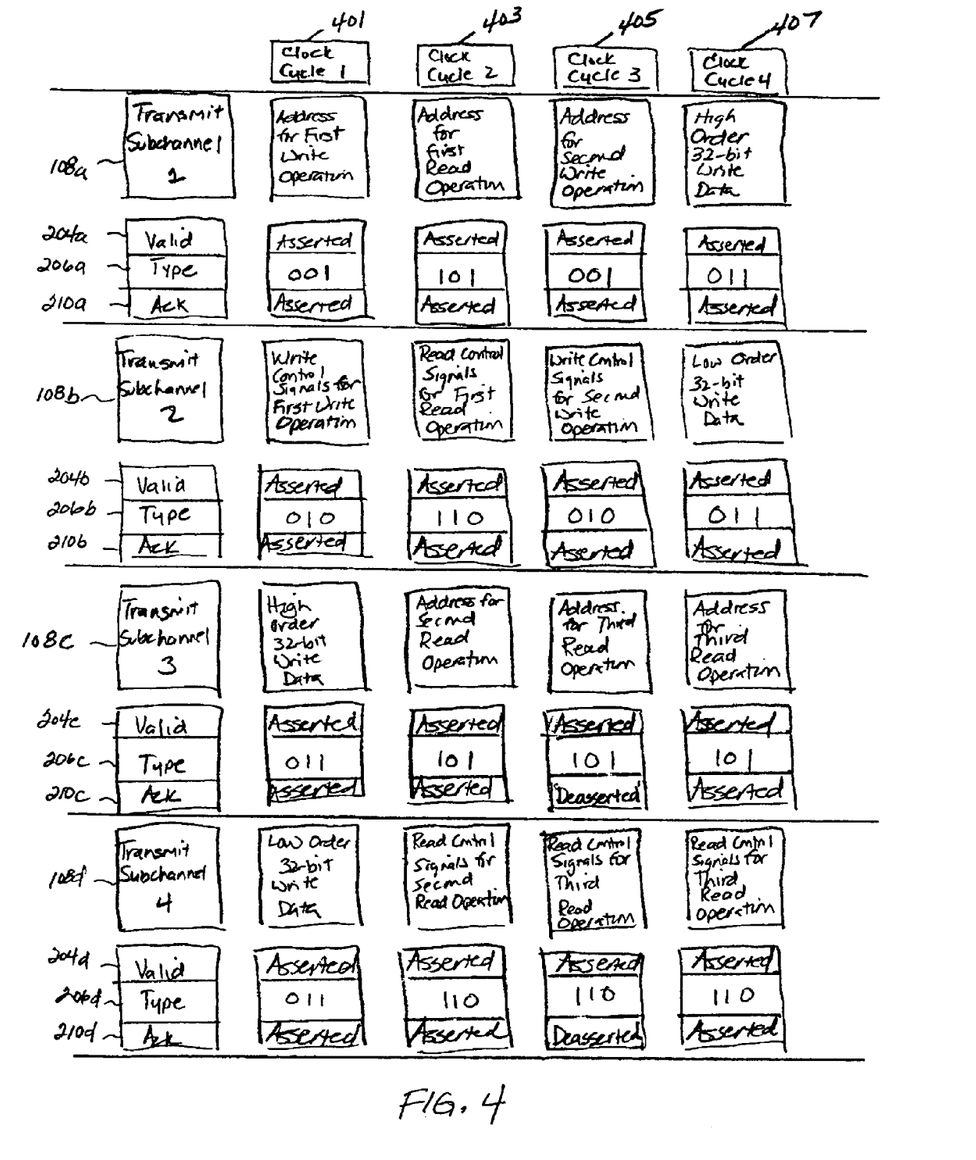
FIG. 4 is a graphic diagram illustrating the manner in which information is broadcast in one embodiment of the high performance bus of FIG. 3.

FIG. 4 is a conceptual timing diagram illustrating the broadcast of information on a transmit channel having four sub-channels with independent signaling capability. In this example, a complete 8-byte write data payload broadcast may be completed across the four sub-channels within a single clock cycle. More specifically, during the first clock cycle 401, the sending component may broadcast a 32-bit address location on the first sub-channel 108*a* and 32-bits of control signals on the second sub-channel 108*b* for the first write operation. The sending component may also broadcast, during the same clock cycle, the higher order 4-bytes of the payload on the third sub-channel 108*c* and the lower order 4-bytes of the payload on the fourth sub-channel 108*d*. The sending component may assert the Valid signal 204*a*-204*d* and set the appropriate Type field 206*a*-206*d* for each sub-channel 108*a*-108*d*.

The sending component detects that the Transfer Ack signal 210*a*-210*d* is asserted for each sub-channel 108*a*-108*d* at the end of the first clock cycle 401, and then initiates two read operations during the second clock cycle 403. Two read operations may be initiated by broadcasting a 32-bit address location on the first sub-channel 108*a* and 32-bits of control signals on the second sub-channel 108*b* for the first read operation. The sending component may also broadcast a 32-bit address location on the third sub-channel 108*c* and 32-bits of control signals on the fourth sub-channel 108*d* for the second read operation. The sending component may assert the Valid signal 204*a*-204*d* and set the appropriate Type field 206*a*-206*d* for each sub-channel 108*a*-108*d*.

The sending component detects that the Transfer Ack 210*a*-210*d* is asserted for each sub-channel 108*a*-108*d* at the end of the second clock cycle 403, and then initiates a second write operation and a third read operation during the third clock cycle 405. The sending component may broadcast a 32-bit address location on the first sub-channel 108*a* and 32-bits of control signals on the second sub-channel 108*b* for the second write operation. The sending component may also broadcast a 32-bit address location on the third sub-channel 108*c* and 32-bits of control signals on the fourth sub-channel 108*d* for the third read operation. The sending component may assert the Valid signal 204*a*-204*d* and set the appropriate Type field 206*a*-206*d* for each sub-channel 108*a*-108*d*.

In this example, at the end of the third clock cycle 405, the Transfer Ack signal 210*a*-210*b* is asserted on the first and second sub-channels 108*a* and 108*b*, but not on the third and fourth sub-channels 108*c* and 108*d*. The sending component may detect that the Transfer Ack signals 210*c*-210*d* on the third and fourth sub-channels 108*c* and 108*d* are not asserted, and thus, determine that it should continue broadcasting the address location and the control signals for the third read operation. The address location and the control signals for the third read operation are shown being broadcast during the fourth clock 407 on the third and fourth sub-channels 108*c* and 108*d*, respectively, but may be broadcast on any sub-channels during any subsequent clock cycle.

In the above example, the receiving component is configured to either acknowledge the address location and the control signals for the third read operation as a pair. However, in some embodiments of the processing system, the receiving component may be configured to acknowledge the address location and control signals independently of one another for the same read or write operation. Similarly, the receiving component may be configured to acknowledge the higher or lower order bytes of the payload individually. In this case, there needs to be a way to tie a broadcast of the control signals, by way of example, for the third read operation to the address location for the same operation previously broadcast. This may be achieved in a variety of ways. By way of example, once an address location for a read or write operation is sent and acknowledged by the receiving component, the address for the next read or write operation is not broadcast until the control signals associated with the current read or write operation request is received and acknowledged by the receiving component. The same rule may be extended to cover a payload broadcast. By way of example, if the sending component detects a Transfer Ack signal for the broadcast of the higher order bytes of the payload, but not the lower order bytes of the payload, the next payload is not broadcast until the lower order bytes of the current payload broadcast is received and acknowledged by the receiving component.

Returning to FIG. 4, the sending component may broadcast the payload for the second write operation during the fourth clock cycle 407. This may be achieved by broadcasting the higher order 4-bytes of the payload on the first sub-channel 108*a* and the lower order 4-bytes of the payload on the second sub-channel 108*b* for the second write operation, with the appropriate signaling on each sub-channel 108*a*-108*b*. The sending component may also broadcast the 32-bit address location on the third sub-channel 108*c* and 32-bits of control signals on the fourth sub-channel 108*d* for the third read operation, with the appropriate signaling on each sub-channel 108*c*-108*d*. The sending component may assert the Valid signal 204*a*-204*d* and set the appropriate Type field 206*a*-206*d* for each sub-channel 108*a*-108*d*.

Figure 5:
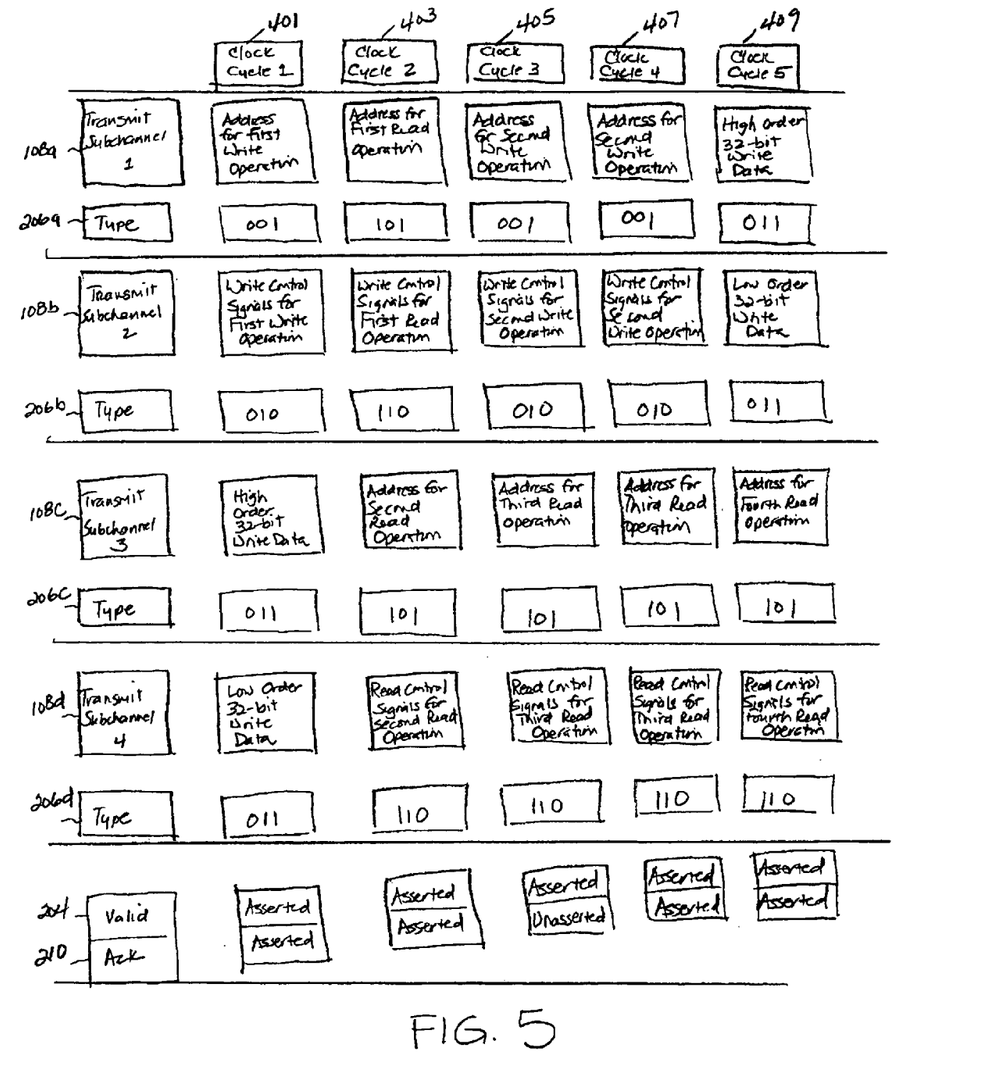
FIG. 5 is a graphic diagram illustrating the manner in which information is broadcast in another embodiment of the high performance bus of FIG. 3.

FIG. 5 is a conceptual timing diagram illustrating the broadcast of information on a transmit channel having four sub-channels with common valid and transfer acknowledge signals. In this example, the bus operations performed during the first two clock cycles are similar to those discussed earlier in connection with FIG. 4. That is, a complete write operation is performed by the sending component during the first clock cycle 401 and two read operations are initiated by the sending component during the second clock cycle 403. The only difference is that a common Valid signal 204 is asserted by the sending component and a common Transfer Ack signal 210 is asserted by the receiving component.

The bus operation performed during the third clock cycle 405 is also similar to the bus operation described in connection with FIG. 4 for the same clock period. The sending component initiates a second write operation by broadcasting a 32-bit address location on the first sub-channel 108*a* and 32-bits of control signals on the second sub-channel 108*b*, with the appropriate Type field 206*a*-206*b* for each sub-channel 108*a*-108*b*. Simultaneously, the sending component initiates a third read operation by broadcasting a 32-bit address location on the third sub-channel 108*c* and 32-bits of control signals on the fourth sub-channel 108*d*, again with the appropriate Type field 206*c*-206*d* for each sub-channel 108*c*-108*d*. The sending component also asserts a Valid signal 204 to indicate to the receiving component that valid information is being broadcast on the sub-channels 108*a*-108*d*.

At the end of the third clock cycle 405, the sending component determines that the receiving component has not asserted Transfer Ack signal 210. The receiving component's failure to assert the Transfer Ack signal 210 may result from the broadcast of a single sub-channel not being able to acknowledge the broadcast. As a result, the sending component will continue to broadcast during the fourth clock cycle 407 all information that was broadcast during the third clock cycle 405. Alternatively, the sending component may rebroadcast the address locations and control signals for the second write operation and third read operation during a later clock cycle, or rebroadcast the same address locations and control signals across multiple clock cycles. By way of example, the sending component may broadcast the address location and control signals for the second write operation during the fourth clock cycle and rebroadcast the address location and control signals for the third read operation during the fifth clock cycle, or any other clock cycle. The address location and the control signals for any particular bus operation do not necessarily have to be broadcast during the same clock cycle. The address location for the third read operation may be rebroadcast during the fifth clock cycle and the control signals for the same may be rebroadcast during the sixth clock cycle. An implicit addressing scheme may be used to prevent the sending component from initiating a fourth read operation before the broadcast of the control signals for the third read operation. In this way, the receiving component can tie the control signals rebroadcast in the fifth clock cycle to the address location received in the fourth clock cycle. Moreover, the address locations and the control signals for the second write operation and third read operation may be rebroadcasted on different sub-channels than they were previously broadcast on. During the fourth clock cycle, the sending component may rebroadcast the address location and control signals for the second write operation on the second and third sub-channels, and the address location and control signals for the third read operation of the first and fourth sub-channels.

In this high performance bus embodiment, the ordering of the bus operations initiated during the same clock cycle may be implicit by position. A bus operation initiated by broadcasting an address location on the first sub-channel 108*a* will be performed before any other bus operation initiated by broadcasting an address location on any other sub-channel 108*b*-108*d* during the same clock cycle. A bus operation initiated by broadcasting an address location on the second sub-channel 108*b* will be performed before any other bus operation initiated by broadcasting an address location on the third or fourth sub-channels 108*c*-108*d*. Finally, a bus operation initiated by broadcasting an address location on the third sub-channel 108*c* will be performed before a bus operation initiated by broadcasting an address location on the fourth sub-channel 108*d*. Thus, by way of example, if the address locations for the read and write operations initiated during the fourth clock cycle 407 in FIG. 5 are the same, the receiving component may wait until the payload broadcast on the first and second sub-channels 108*a* and 108*b* during the fifth clock cycle 409 is written to the address location before providing the newly written data at this address location to the receive channel for transmission to the sending component.

In the embodiment of the high performance bus described thus far, the write data does not need to be broadcast immediately following the broadcast of the write operation request (i.e., the address location and control signals). Other higher priority read operation requests and/or commands may be interleaved with the write data broadcast on the transmit channel 108. However, if the sending component interleaves the read operation requests and/or commands with the write data, then the sending component should be configured with an address back-off mechanism.

As described earlier in connection with FIG. 2, the sending component samples the Transfer Ack signal 210 following a broadcast on the Transmit Channel 208. If the sending component fails to detect an asserted Transfer Ack signal 210, then it may repeat the broadcast during the following clock cycle. The broadcast may be repeated every clock cycle until the sending component detects an asserted Transfer Ack signal 210. A problem may arise when the address queue is full during a read operation request, and therefore, cannot accept any more address locations. At the same time, the receiving component needs to complete the pending write operation in order to free up space in the address queue. In this case, the receiving component is said to be deadlocked.

The address back-off mechanism is designed to allow the write operation to be completed when the receiving component is in deadlock. This may be achieved by limiting the number of repeat broadcasts by the sending component in connection with a read operation request. If the receiving component does not acknowledge a read operation request with a Transfer Ack signal within a certain number of clock cycles, then the sending component may abort the request by sending the remaining write data in place of the address location for the current read operation request. If there is not a pending write operation that needs to be completed, then the broadcast of the read operation request does not need to be aborted. The broadcast may continue until the receiving component acknowledges the request.

The address back-off mechanism may not be needed if the sending component does not interleave read operation requests with write data. That is, if the address location for a write operation is followed immediately by the control signals, and then immediately followed by the write data, then the receiving component will never encounter deadlock. However, this may degrade the performance of the receive channel because the sending component may not be able to keep the pipeline of read operations sufficient to fully utilize the bandwidth of the receive channel.

Figure 6:
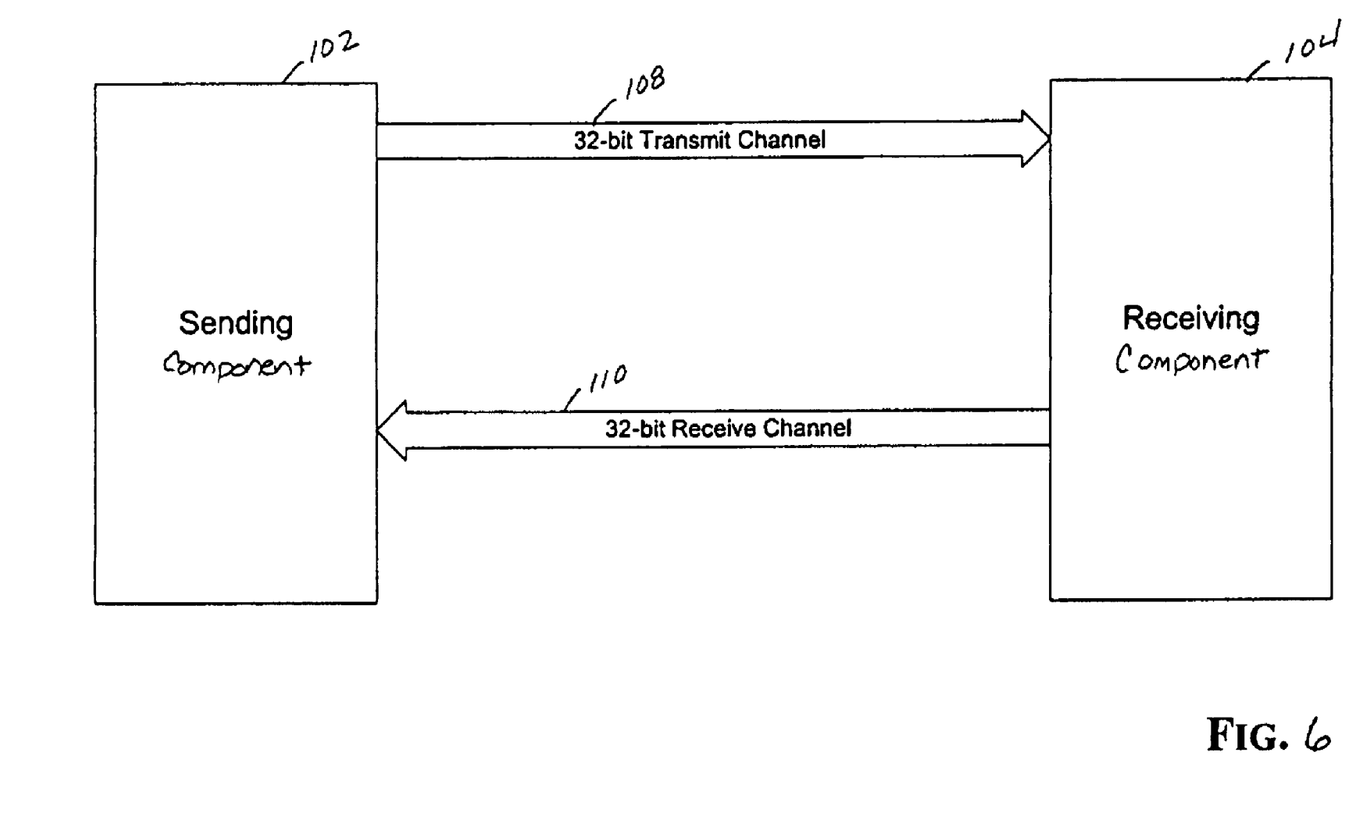
FIG. 6 is a conceptual block diagram illustrating an example of a point-to-point connection over a low bandwidth two channel bus between two components in a processing system.

FIG. 6 is a conceptual block diagram illustrating a point-to-point connection between two components over a low bandwidth bus. The low bandwidth bus may be implemented with a single transmit channel 108 and a single receive channel 110 requiring fewer signals and resulting in lower power dissipation. In the example shown in FIG. 6, the sending component 102 may broadcast information to the receiving component 104 over a 32-bit transmit channel 108, and the receiving component 104 may broadcast information back to the sending component 102 over a 32-bit receive channel 110. Alternatively, this same bus architecture may be implemented with narrower bus widths.

Figure 7:
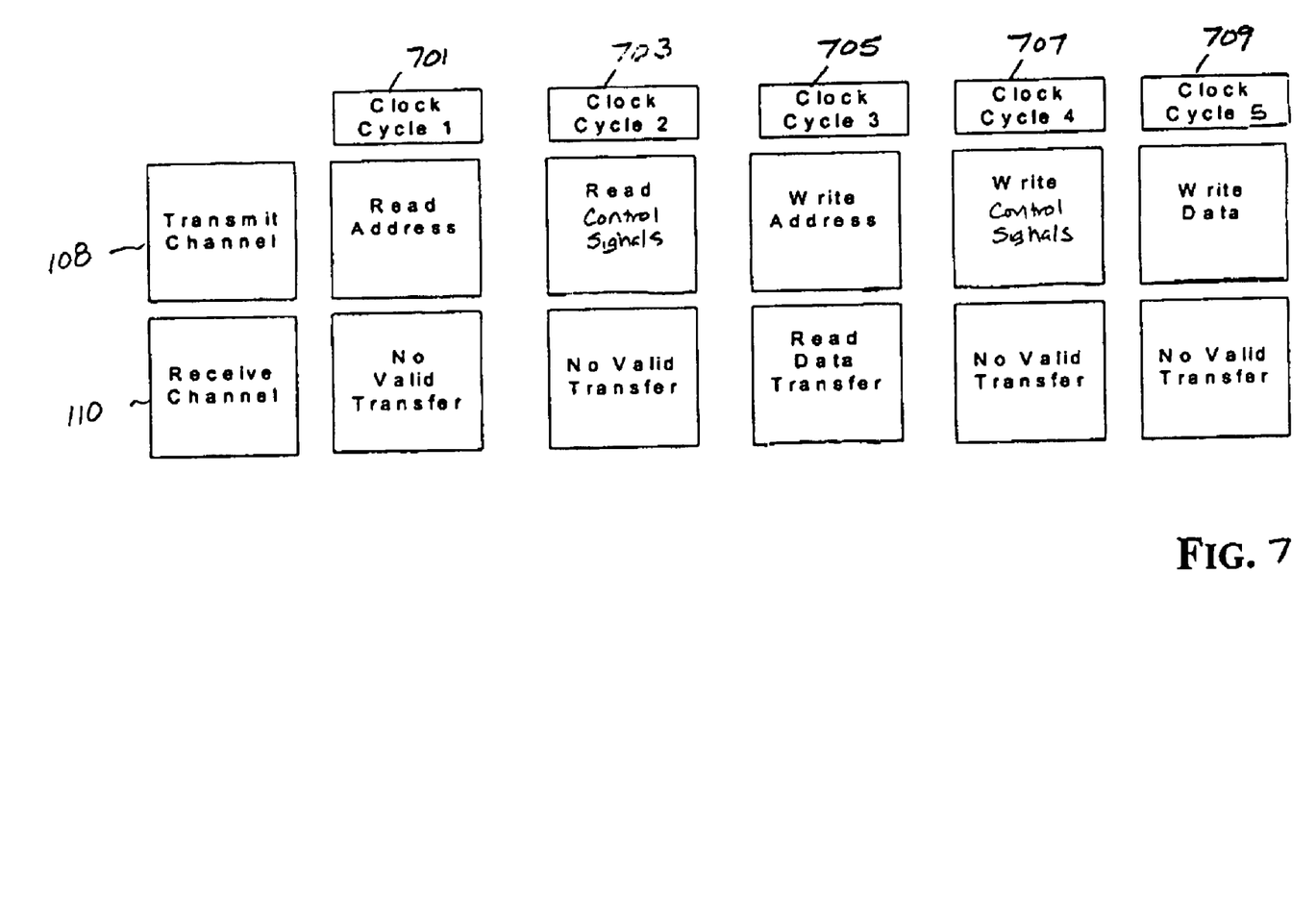
FIG. 7 is a graphic diagram illustrating the manner in which information is broadcast in one embodiment of the low bandwidth bus of FIG. 5.

Although this configuration continues to allow for the transmit and receive channels 108 and 110 to broadcast information simultaneously, each read or write operation may now require multiple clock cycles as shown in the block diagram of FIG. 7. In this example, two clock cycles are used to initiate a read operation. More specifically, a 32-bit address location may be broadcast on the transmit channel 108 in the first clock cycle 701, followed by 32-bits of control signals in the following clock cycle 703. A 4-byte payload may be read from the receiving component in response to this request and broadcast on the receive channel 110 in the third clock cycle 705.

Concurrently with the broadcast of the payload on the receive channel, the sending component may initiate a write operation. In this case, the write operation uses three clock cycles. In the third clock cycle 705, the sending component broadcasts a 32-bit address location on the transmit channel 108, followed by 32-bits of control signals in the fourth clock cycle 707, followed by a 4-byte payload in the fifth clock cycle 709.

Figure 8:
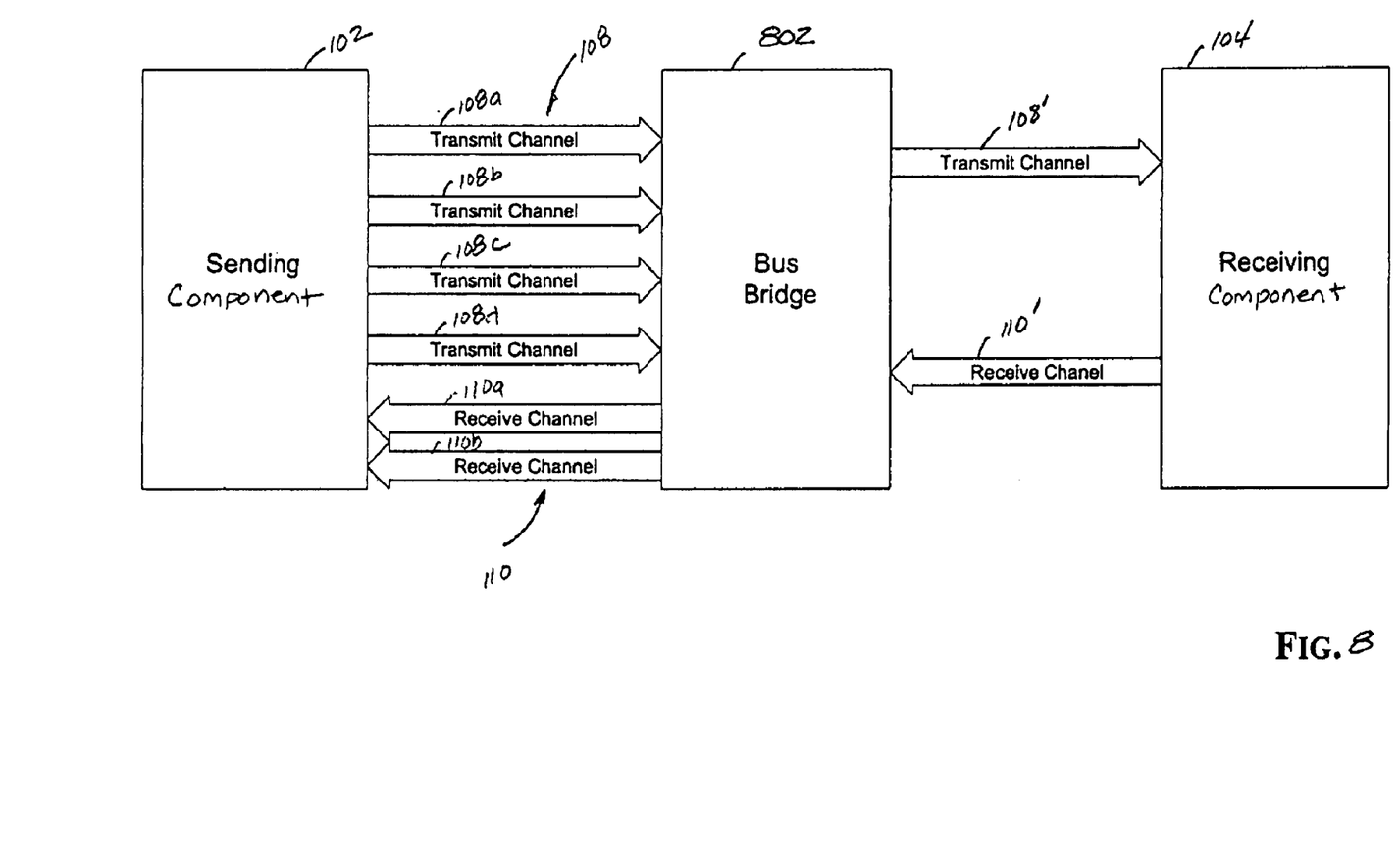
FIG. 8 is a conceptual block diagram illustrating an example of a point-to-point connection between a high performance component and a lower bandwidth component through a bridge.

In many processing systems, some devices may require a high bandwidth interconnect while others can sufficiently operate with a much lower bandwidth interconnect. By using a scalable bus architecture, the implementation of bridges may be implemented with a common signaling protocol. FIG. 8 is a conceptual block diagram illustrating a point-to-point connection between two components through a bridge. The bridge 802 may be used to interface a sending component 102 attached to a high performance bus to a receiving component 104 attached to a lower bandwidth bus. The high performance bus may be implemented with a transmit channel 108 having four 32-bit sub-channels 108a-108d and a receive channel 110 having two 32-bit receive channels 110a and 110b. The lower bandwidth bus may be implemented with a single 32-bit transmit channel 108' and a single 32-bit receive channel 110'.

In this example, a write operation may be completed between the sending component device 102 and the bridge 802 within a single clock cycle using the four transmit sub-channels 108a-108d of the high performance bus to broadcast the address location, the control signals, and an 8-byte payload as described earlier in connection with FIGS. 3-5. The bridge 802 may buffer and broadcast the information to the receiving component 104 over the 32-bit transmit channel 108' of the lower bandwidth bus in four clock cycles as described earlier in connection with FIGS. 6 and 7.

In the case of a read operation, an address location and the control signals may be broadcast by the sending component 102 to the bridge 802 on two transmit sub-channels of the high performance bus within a single clock cycle. The bridge 802 may buffer and broadcast this information to the receiving component 104 over the 32-bit transmit channel 108' in two clock cycles. An 8-byte payload may then be broadcast from the receiving component 104 to the bridge 802 on the 32-bit receive channel 110', buffered in the bridge 802, and then broadcast by the bridge 802 to the sending component 102 on the two receive sub-channels 110a and 110b in a single clock cycle.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the sending and/or receiving component, or elsewhere. In the alternative, the processor and the storage medium may reside as discrete components in the sending and/or receiving component, or elsewhere.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A processing system comprising:
a bus having transmit and receive channels, the transmit channel having a plurality of sub-channels;
a sending component adapted to broadcast on each of the sub-channels information comprising read and write address locations, read and write control signals, and write data; and
a receiving component adapted to store the write data broadcast and retrieve read data in response to the information broadcast on any of the sub-channels, and further adapted to send the retrieved read data on the receive channel to the sending component;
wherein, in a first signaling mode, the sending component is further adapted to provide to the receiving component independent signaling for each of the sub-channels, the independent signaling comprising a different set of signals corresponding to each of the sub-channels, the independent signaling being sufficient to allow the sending component to transmit and the receiving component to acknowledge transactions on a sub-channel independent of activity on other sub-channels and
in a second signaling mode, the sending component is further adapted to provide to the receiving component common signaling corresponding to each of the sub-channels, and wherein the receiving component is adapted to acknowledge a transaction only when all of the sub-channels are able to service the transaction.

2. The processing system of claim 1 wherein the common signaling corresponding to each of the sub-channels includes a signal indicating that the information broadcast on each of the sub-channels is valid.

3. The processing system of claim 1 wherein the receiving component is further adapted to provide to the sending component second common signaling over all of the sub-channels.

4. The processing system of claim 3 wherein the second common signaling over all of the sub-channels includes a signal indicating that the receiving component is capable of receiving the information.

5. The processing system of claim 4 wherein the sending component is further adapted to continue broadcasting the information that was broadcast on each of the sub-channels during a period when the independent signaling indicates that the receiving component is unable to receive the information.

6. The processing system of claim 1 wherein the receiving component is further adapted to provide to the sending component second independent signaling for each of the sub-channels, the second independent signaling including a plurality of second signals, one for each of the sub-channels, and wherein each of the second signals indicates that the receiving component is capable of receiving the information broadcast on its respective sub-channel.

7. The processing system of claim 6 wherein the sending component is further adapted to continue broadcasting the information that was broadcast on a particular sub-channel during a period when the second signal for the particular sub-channel indicates that the receiving component is unable to receive the information.

8. The processing system of claim 7 wherein the sending component is further adapted to continue broadcasting the information on the particular sub-channel.

9. A method of communicating between a sending component and a receiving component over a bus, the method comprising:
broadcasting from the sending component to the receiving component, on each of a plurality of sub-channels of a transmit channel, information comprising read and write address locations, read and write control signals, and write data;
providing from the sending component to the receiving component independent signaling for each of the sub-channels, the independent signaling comprising a different set of signals corresponding to each of the sub-channels, the independent signaling being sufficient to allow the receiving component to determine the type of information broadcast on each of the sub-channels;
storing the write data and retrieving read data in response to the information broadcast on any of the sub-channels;
retrieving the read data based on the read address locations and the read control signals broadcast on the transmit channel; and
providing from the sending component to the receiving component common signaling corresponding to each of the sub-channels, wherein the receiving component is adapted to acknowledge a transaction when all of the sub-channels are able to service the transaction.

10. The method of claim 9 wherein the common signaling includes a signal indicating that the information broadcast on each of the sub-channels is valid.

11. The method of claim 9 further comprising providing from the receiving component to the sending component second common signaling over all of the sub-channels.

12. The method of claim 11 wherein the second common signaling over all of the sub-channels includes a signal indicating that the receiving component is capable of receiving the information.

13. The method of claim 12 further comprising continuing to broadcast the information that was broadcast on each of the sub-channels during a period when the second signaling indicated that the receiving component was unable to receive the information.

14. The method of claim 9 further comprising providing from the receiving component to the sending component independent signaling associated with the sub-channels, the independent signaling including a plurality of signals, one for each of the sub-channels, and wherein each of the signals indicates that the receiving component is capable of receiving the information broadcast on its respective sub-channel.

15. The method of claim 14 further comprising continuing to broadcast the information that was broadcast over a particular sub-channel during a period when the signal associated with the particular sub-channel indicates that the receiving component is unable to receive the information.

16. The method of claim 15 wherein the broadcast of the information is continued on a different sub-channel than the particular sub-channel.

17. The processing system of claim 1, wherein each sub-channel is adapted to broadcast a plurality of types of information.

18. The processing system of claim 17, wherein the type of information includes one of address information, control information, and data information.

19. The method of claim 9, wherein each of the sub-channels is adapted to broadcast a plurality of types of information.

20. The method of claim 19 wherein the type of information includes one of address information, control information, and data information.

* * * * *

UNITED STATES PATENT AND TRADEMARK OFFICE
CERTIFICATE OF CORRECTION

PATENT NO.       : 7,617,343 B2                                        Page 1 of 1
APPLICATION NO. : 11/070016
DATED            : November 10, 2009
INVENTOR(S)      : Hofmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,617,343 B2
APPLICATION NO. : 11/070016
DATED : November 10, 2009
INVENTOR(S) : Hofmann et al.

It is certified that error appears in the above-identified patent and that said Letters Patent is hereby corrected as shown below:

Column 14, line 53, Claim 1: "sub-channels and" to read as --sub-channels, and--

Signed and Sealed this
Seventh Day of June, 2011

David J. Kappos
*Director of the United States Patent and Trademark Office*